United States Patent
Kuehnel et al.

(10) Patent No.: US 9,338,279 B2
(45) Date of Patent: *May 10, 2016

(54) MECHANISM FOR CONNECTING A MOBILE DEVICE TO A NETWORK

(71) Applicant: Microsoft Technology Licensing, LLC, Redmond, WA (US)

(72) Inventors: Thomas Kuehnel, Seattle, WA (US); Gregory Scott, Seattle, WA (US); John D. Bruner, Bellevue, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,710

(22) Filed: Jan. 6, 2015

(65) Prior Publication Data
US 2015/0237197 A1 Aug. 20, 2015

Related U.S. Application Data

(63) Continuation of application No. 13/544,736, filed on Jul. 9, 2012, now Pat. No. 8,934,389.

(60) Provisional application No. 61/588,090, filed on Jan. 18, 2012.

(51) Int. Cl.
| | |
|---|---|
| H04W 4/00 | (2009.01) |
| H04M 1/73 | (2006.01) |
| H04W 76/02 | (2009.01) |
| H04W 52/02 | (2009.01) |
| H04W 4/16 | (2009.01) |

(52) U.S. Cl.
CPC ................. *H04M 1/73* (2013.01); *H04W 4/001* (2013.01); *H04W 52/0274* (2013.01); *H04W 76/02* (2013.01); *H04W 4/16* (2013.01)

(58) Field of Classification Search
CPC ..................................................... H04W 4/001
See application file for complete search history.

(56) References Cited

U.S. PATENT DOCUMENTS

| | | | |
|---|---|---|---|
| 5,724,356 | A | 3/1998 | Parameswaran Nair et al. |
| 7,606,202 | B2 | 10/2009 | Marathe et al. |
| 8,112,116 | B2 | 2/2012 | Sadovsky et al. |
| 8,934,389 | B2 * | 1/2015 | Kuehnel et al. ............... 370/311 |
| 2008/0181220 | A1 | 7/2008 | Babbar et al. |
| 2010/0118845 | A1 | 5/2010 | Solver |
| 2010/0250783 | A1 | 9/2010 | Elzur et al. |
| 2010/0303008 | A1 | 12/2010 | Wietfeldt et al. |

(Continued)

OTHER PUBLICATIONS

Cheng et al., "SmartSiren: VirusDetection and Alert for Smartphones,"*MobiSys '07*, Jun. 2007, pp. 1-14.

*Primary Examiner* — John Blanton
(74) *Attorney, Agent, or Firm* — John Jardine; Judy Yee; Micky Minhas

(57) ABSTRACT

A system and method are disclosed for offloading control of services in a mobile device to a non-cellular wireless network, such as Wi-Fi. The described system and method allow the overall connection management to be performed by an application processor, while services are handled in a modem using Wi-Fi connectivity. The Wi-Fi subsystem can be fully driven by the modem for time critical operations allowing the application processor to be off (or in low-power mode) when it is not involved in the delivery of services. Battery power is saved by being able to substantially power down the application processor.

19 Claims, 6 Drawing Sheets

(56) References Cited

U.S. PATENT DOCUMENTS

| | | |
|---|---|---|
| 2011/0053574 A1 | 3/2011 | Rice |
| 2011/0320588 A1 | 12/2011 | Raleigh |
| 2012/0023189 A1 | 1/2012 | Giaretta et al. |
| 2012/0254878 A1 | 10/2012 | Nachman et al. |
| 2013/0064132 A1 | 3/2013 | Low et al. |

* cited by examiner

MECHANISM FOR CONNECTING A MOBILE DEVICE TO A NETWORK

CROSS REFERENCE TO RELATED APPLICATION

This application is a Continuation of U.S. patent application Ser. No. 13/544,736, filed Jul. 9, 2012, which claims priority from U.S. Provisional Application No. 61/588,090, filed Jan. 18, 2012. Both applications are incorporated herein by reference in their entirety.

FIELD

The present application relates to connecting a mobile device to a network, such as a Wi-Fi network.

BACKGROUND

In mobile devices having wireless connectivity, there is a growing movement to offload traffic of new services, such as IMS based services, to Wi-Fi if whenever possible. The motivation comes from spectrum scarcity for those new often bandwidth hungry services and the limited cellular coverage that deliver those services. One of the challenges in modern smartphone architectures is the way the functionality is separated between a cellular modem and an application processor, with the Wi-Fi connectivity fully driven from the application processor. However, many of the services like Voice are handled by the modem to be power efficient. Meanwhile, the application processor continues to consume power limiting the battery life of the mobile device. With the advent of IP-based services, more functionality is being moved to the modem. This includes a separate TCP/IP stack, IMS (SIP) stack for call handling, etc. Wi-Fi connection management functionality and interface is traditionally controlled by the Operating System and the application processor due to its complexity and tight interleaving with the user experience. Thus, there is a need to more efficiently manage functionality between the application processor and the modem.

SUMMARY

A system and method are disclosed for offloading control of services in a mobile device to a non-cellular wireless network, such as Wi-Fi. The described system and method allow the overall connection management to be performed by an application processor, while services are handled in a modem using Wi-Fi connectivity. The Wi-Fi subsystem can be fully driven by the modem for time critical operations allowing the application processor to be off (or in low-power mode) when it is not involved in the delivery of services. Battery power is saved by being able to substantially power down the application processor.

In one embodiment, when a packet is received from the non-cellular network, a lookup is performed using an associated packet address. A decision can then be made whether the packet should be processed by an application processor or a modem processor. The application processor is typically a processor that runs user applications, such as email applications, etc. The modem processor typically runs applications executing in the modem for communications over networks. Based on the performed lookup, the packet is either forwarded for processing by the application processor or the modem processor.

In another embodiment, the forwarded packet can be routed to a TCP/IP stack associated with the application processor or the TCP/IP stack associated with the modem. Furthermore, a filter engine can be used to switch the packets arriving from the non-cellular network to either of the TCP/IP stacks.

In yet another embodiment, a profile cache can be used that includes a list of wireless networks to which connection is approved. The profile cache can also contain one or more of the following: the credentials needed to connect to the wireless network, network specific parameters, and the priority of wireless networks with respect to each other. The profile cache can receive the profiles from the connection manager that can be exposed to the user interface and connects to provisioning infrastructure. Examples for network specific parameters are: broadcast network, hidden network, security mechanisms, etc. The priority can be used to indicate to the Wi-Fi subsystem if it should connect to this network rather than another one of lower priority.

In yet another embodiment, the application processor can be used to initiate a phone call by, for example, receiving user dialing instructions. Then, after the phone call is initiated receipt of packets carrying the actual voice data packets can be switched from the application processor to the modem processor. In this way, the application processor can be put into a low-power mode to conserve battery life. In yet another embodiment, packets constituting audio and/or video content can be switched to the modem processor while signaling (call control) packets continue to be delivered to the application processor.

Thus, an advantage of the present application is that the application processor, which is traditionally always running when Wi-Fi is active, can be placed in a low-power mode or switched off. For example, when Wi-Fi is not connected, the profile cache in the modem or Wi-Fi subsystem allows the Wi-Fi subsystem to operate independently from the main OS. Therefore, the application processor does not have to wake up whenever the Wi-Fi subsystem is searching for a valid connection. Additionally, when Wi-Fi is connected but idle the application processor can be switched into low-power mode or off. In particular, once Wi-Fi is connected to the serving access point (at layer 2), the Wi-Fi subsystem maintains the layer 2 connectivity—independent of the operating system being involved. As consequence, the operating system need not be woken up. Broadcasts, such as ARPs, etc. can be filtered by the Wi-Fi subsystem. Once connectivity has been indicated to the modem application, it can be set up an end-to-end link to the service, such as an IMS endpoint. Upon success it may switch over. Furthermore, when Wi-Fi connected and used, the modem can handle all communications independent of application processor, such as when a phone call is in progress.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Figure 1:
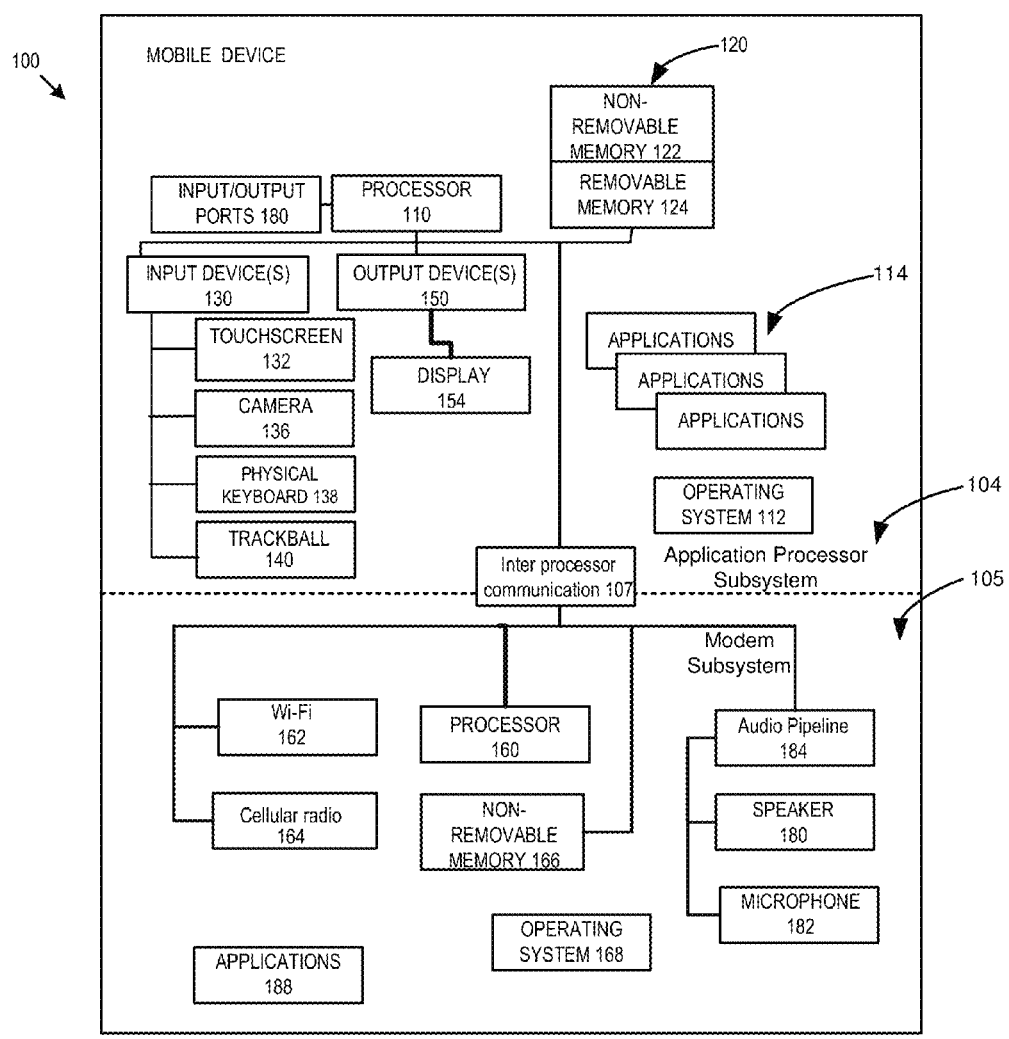
FIG. 1 is an example mobile device that can include two or more subsystems and that can be used in multiple embodiment of the present application.

FIG. 1 illustrates an exemplary device 100, such as a mobile device, that can be used with the embodiments described herein. The device itself represents a distributed system with autonomous blocks. In one embodiment, the system comprises of two subsystems, such as a modem subsystem 104 and an application processor subsystem 105. Each entity can have its own processor and also memory and input and output devices. Although two subsystems are shown, there can be any number of subsystems.

Each subsystem can include a variety of optional hardware and software components, and any parts can be executed in hardware, software, or firmware. Each subsystem has its own performance and power consumption characteristics, and the subsystems 104, 105 communicate with each other through inter-processor communication 107. Any components in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular, Wi-Fi, WiMax, or satellite network. Two-way communications can also occur through peer-to-peer routing, such as Wi-Fi Direct.

An exemplary application processor subsystem 104 includes a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets The mobile device 100 can support one or more input devices 130, such as a touchscreen 132, camera 136, physical keyboard 138 and/or trackball 140 and one or more output devices 150, such as a display 154. An exemplary modem subsystem 105 includes a controller or processor 160. The processor 160 can be operational while the application subsystem processor 110 is placed in a low-power mode. The modem subsystem can connect to Wi-Fi modem 162 and/or a cellular radio modem 164. Other modems can be used in place of or in addition to the illustrated modems. The modem subsystem can also include a non-removable memory 166, similar to the memories already described. An operating system 168 can operate independently of the operating system 112, but the two can communicate together through inter-processor communication 107. The modem subsystem can also include a speaker 180 and microphone 182 to facilitate a user phone conversation (audio and/or video). An audio pipeline 184 can be used for buffering incoming and outgoing voice data. One or more modem subsystem applications 188 can be executed on processor 160 and supported by operating system 168.

Although not shown, the mobile device may contain hardware accelerators for media handling. Additionally, the mobile device may be coupled to a graphics and/or video rendering processor so as to further allow the application processor to enter a low-power mode.

Figure 2:
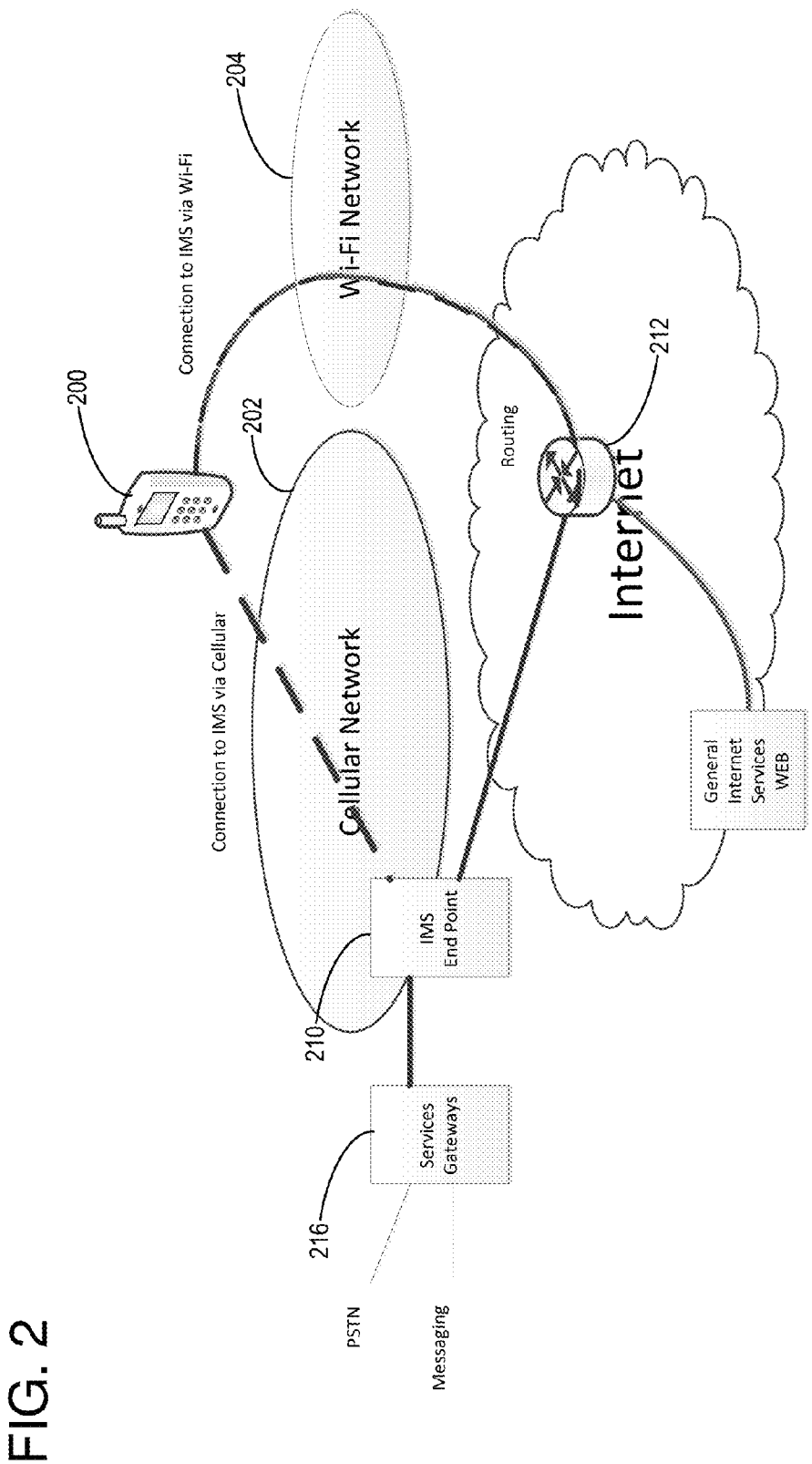
FIG. 2 shows different networks through which a mobile device can connect to a service, such as an IMS end point.

FIG. 2 shows a mobile device 200 that can communicate through two or more different networks, such as a cellular network 202 and a non-cellular network, such as a Wi-Fi network 204. The cellular network can connect to an IP multimedia subsystem (IMS) endpoint 210 directly, whereas the Wi-Fi network connects through an Internet router 212. The IMS endpoint allows access to services and gateways 216 that allows for access to a publicly switched telephone network and messaging. Other non-cellular networks can be used in place of Wi-Fi, such as WIMAX, etc. Although an IMS endpoint is shown, this is just an exemplary service and other services can be used.

A scheme is proposed that allows the overall connection management to be performed by the application processor/OS, while the services that are handled in the modem can still use Wi-Fi connectivity. The Wi-Fi subsystem can be fully driven by the modem subsystem for time critical operations allowing the application processor to be off or placed in low-power mode when it is not involved in the delivery of services. There can be a partitioning between Wi-Fi control (a control plane) and user plane functionality.

The control plane is responsible for connection management and connects to a network based on a prioritized list of profiles. A profile can contain the network properties, such as name, network type, security mechanisms as well as credentials. Additional parameters contained in a profile can include network type, neighbors, location, channel information, Layer 3 address information, etc. The profiles can be preconfigured or user entered. Profiles are typically ordered in a priority list, which means that the Wi-Fi attempts to connect to the network with the highest priority order in the list whenever it is not connected. When connected the Wi-Fi subsystem can try to connect to a higher prioritized network as it becomes available. However, this behavior may be implemented in different ways to assure best possible user experience.

Traditionally the control plane is implemented in the connection manager that is running in the application processor. In the proposed approach, the connection management including profile creation, deletion, validation, user interaction is still handled by the Connection Manager in the distributed system. However, the profile matching can be completed in the Wi-Fi subsystem or the adjacent controller, e.g. in the modem in case of a smartphone. Therefore, the prioritized profile list is passed directly to the Wi-Fi subsystem or the adjacent controller. This way, the application processor can be "off" while the modem or Wi-Fi subsystem does all the real time processing. The processor running the Connection Manager is woken up in case of state changes or failures that require user interaction or notification to other parts of the OS.

The user plane can comprise the TCP/IP stack and user applications. Since the user plane is split between multiple processors, a filter engine is added to route the traffic to the respective application processor. The purpose of the filter engine is to route packets that belong to a specific connection following a deep packet inspection and based of protocol parameters such as ports, addresses (destination source, flow identifiers) to the respective subsystem. The filter engine is configured based on matching connection parameters for the respective system component within the distributed system, e.g. modem vs. app processor in a smartphone.

Filter masks can be dynamically added via control path from the respective distributed system. For example, an application running on subsystem X adds a filter that is reflective of its own address/port and/or of the destination. This way any traffic can be routed directly to the destination. The filter engine logic itself can exist in the Wi-Fi subsystem or in the adjacent controller.

Figure 3:
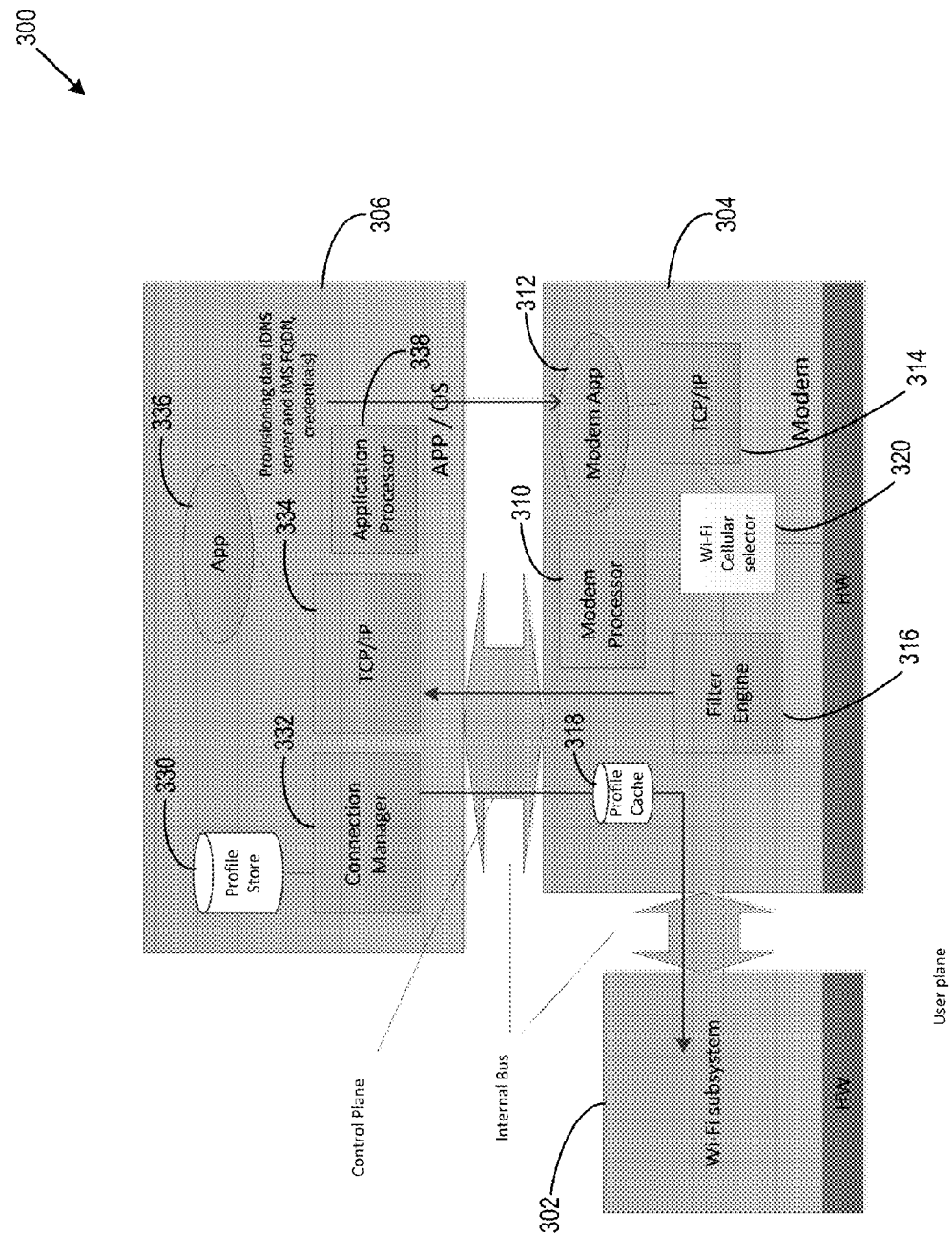
FIG. 3 shows an exemplary hardware structure that can be used for establishing a Wi-Fi connection.

FIG. 3 shows an example hardware diagram that can be used implement Wi-Fi phone calling. The system 300 includes a Wi-Fi subsystem 302, a modem sub-system 304, and an application/operating system sub-system 306. The Wi-Fi subsystem could be replaced by other non-cellular connection sub-systems, such as for connection to other short-range networks. In this embodiment, the Wi-Fi subsystem is connected to the modem subsystem 304, rather than the application/OS subsystem 306, which is the traditional configuration. The modem subsystem 304 includes a modem processor 310, one or more modem applications 312, a TCP/IP stack 314, a filter engine (also called a switching engine) 316, a profile cache 318, and a Wi-Fi cellular selector 320. The application/OS sub-system 306 includes a profile store 330, a connection manager 332, a TCP/IP stack 334, one or more user-based applications 336 (e.g., email application, dialing application, etc.), and an application processor 338.

The modem processor 310 is used to run a modem operating system (not shown) and any modem applications 312. The Wi-Fi cellular selector 320 is a switch that switches the modem between the Wi-Fi subsystem 302 and a cellular connection over the cellular network 202 (FIG. 2). The filter engine 316 can switch packets received from the Wi-Fi subsystem between the application/OS subsystem 306 and the modem subsystem 304. The filter engine 316 can maintain a list of network addresses, and perform an incoming packet inspection. A lookup can be performed to compare a network address of the incoming packet against the list of network addresses. If a match is found, the packet can be forwarded to the TCP/IP stack 314 in the modem for processing by the modem processor 310 running the modem application 312. Otherwise, the filter engine 316 can forward the packet to the TCP/IP stack 334 in the application/OS subsystem 306. The filter engine 316 performs a packet inspection based on a TCP/IP address, and forwards the packet to the appropriate stack for processing. Thus, the filter engine can make intelligent decisions about packet switching between an application/OS subsystem and a modem subsystem. When a modem application, such as IMS, initiates a request it will first send a DNS (Domain Name System) request. The filter engine can keep track of the outstanding DNS requests from the modem TCP/IP stack and perform deep packet inspection of all incoming packets in order to match the DNS response and route it back to the modem app via the TCP/IP stack in the modem. A similar process is used with TCP requests where the modem can keep track of the source port and destination address in order to identify responses that are part of the session. An alternative embodiment includes a single DNS client shared between modem and application processor that can be either located in the app processor or in the modem. The DNS client is called at the beginning of a session when a fully qualified domain name (FQDN) is resolved to an IP address. Yet another approach is to assure that both DNS client use different DNS server addresses. This assures that the filter engine forwards the response to the appropriate client. Since there is a TCP/IP stack in both the modem and OS in the application processor, it is possible for them to allocate conflicting source ports. The filter engine in the modem can do deep packet inspection and keep track of what source ports have been allocated by the OS in the application processor. In the event that the application processor uses a source port already in use by the modem, the modem can allocate a new source port for that session, maintain a mapping between the two, and perform a translation on every packet in that session. This method allows the TCP/IP stack in the application processor to function independently without any knowledge of the TCP/IP stack in the modem. An alternative approach would be to have the TCP/IP stack in the application processor reserve a range of source ports for its use and pass that information to the modem to ensure both TCP/IP stacks do not use conflicting source ports.

The profile cache 318 includes a list of wireless networks to which connection is approved. The connection manager 332 provides the intelligence using the profile store 330 to determine which networks are acceptable for connection. The connection manager 332 can then push the appropriate list down to the profile cache 318. The profile cache 318 can then be used to maintain connections over the Wi-Fi network by the modem subsystem 304. It should be well understood that the profile cache can be placed in a different location, such as in the Wi-Fi subsystem 302.

The Wi-Fi subsystem 302 periodically searches for new or higher prioritized networks. When a signal is detected from a wireless beacon (not shown), the received network identifier is sent to the modem subsystem 304 for comparison against other network identifiers located in the profile cache 318.

Applications running in the modem, such as IMS, require settings to be provisioned to the application before it can function. This is typically done by the mobile network operator, but could be provisioned by an end user as well. The OS on the application processor typically supports methods to provision settings on first boot or over the air using industry standard protocols, such as OMA DM. It is desirable to provision all settings to the modem including APN information (cellular). A protocol can exist between the application processor and modem to allow the provisioning of application specific data to the modem. Specific provisioning data to the application running in the modem includes the address of the corresponding service such as the FQDN (Fully Qualified Domain Name) of the IMS endpoint, DNS server addresses to be used and possible credentials to access any services.

The application in the modem can try to connect to the services end point, such as the IMS Gateway, whenever a Wi-Fi connection becomes available and the end point can be reached and authentication and authorization are successful. Therefore, a notification is sent from the Wi-Fi subsystem to the modem application informing of the availability of a new connection. In case of success any existing connection from the modem application to the IMS endpoint via the cellular network can be torn down.

Likewise when the Wi-Fi connection becomes unavailable or unreliable the modem application can drop the connection and use the cellular connection instead. The cellular selector 320 routes the traffic between the modem and the filter engine that is connected to the Wi-Fi subsystem.

Functions like establishing, maintaining, and tearing down the optimal connection can be done by the modem application itself or aggregated in other functional entities to allow maximum re-use for multiple modem applications if needed. Parameters like signal strength reported from the cellular modem and Wi-Fi sub-system, bandwidth, congestion, jitter, delay noticed at various layers of the networking stack can be used to make a decision to utilize or not utilize the Wi-Fi connection.

Figure 4:
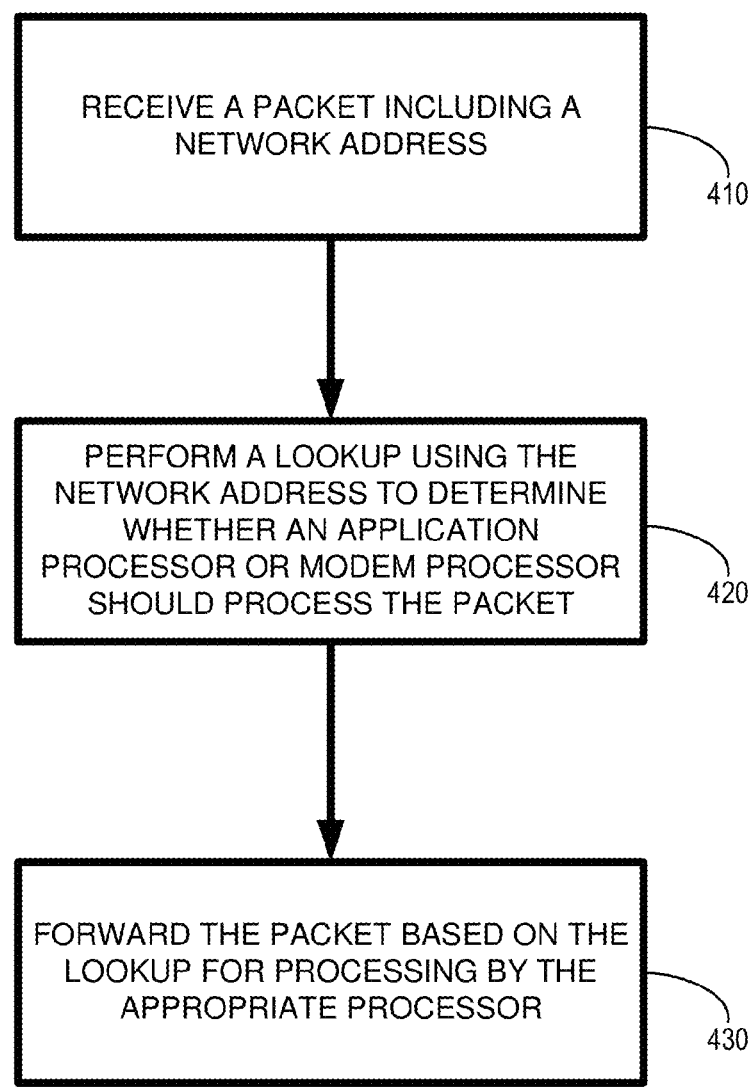
FIG. 4 is a flowchart of a method for switching to a modem processor for communicating over a non-cellular network.

FIG. 4 is a flowchart of a method for connecting a mobile device to a non-cellular network. In process block 410, a packet is received from the non-cellular network including a network address. In process block 420, a lookup is performed using the network address as a key to determine whether an application processor or modem processor should process the packet. In process block 430, based on the lookup, a filter engine forwards the packet to a TCP/IP stack associated with the application processor or a TCP/IP stack associated with the modem processor.

Figure 5:
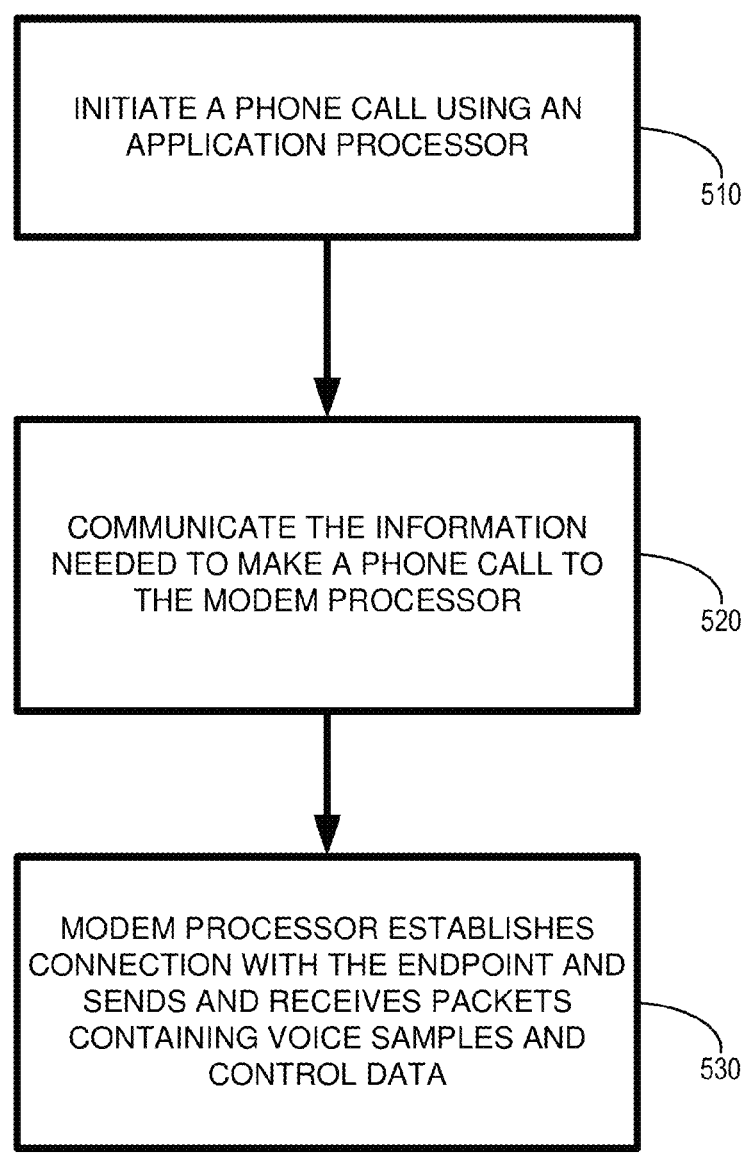
FIG. 5 is another exemplary flowchart of a method for establishing a voice call via a modem processor.

FIG. 5 is a flowchart of a method for initiating a non-cellular phone call, such as a Wi-Fi phone call. In process block 510, a phone call is initiated using an application processor. For example, a user can enter a number into a dialer application running on the application processor. At this point, the application/OS subsystem is in control of the phone call. The dialer application communicates with a modem application, which, in turn, invokes a connection to an end point, which is known by a domain name or IP address. The initiation of the phone call creates an exchange between the modem and the end point as illustrated in block 520. In process block 530, receipt and transmission of the actual packets is handled on the modem processor. Thus, the modem subsystem can take over the call entirely, allowing the application/OS subsystem to switch to low power mode. Ideally the other components involved in the audio processing are also part of the modem subsystem. In other embodiments, the application processor can retain control of an SIP session, but route all media packets through the modem subsystem. In other embodiments, the touchscreen and display can be driven by the media subsystem directly to free the application processor entirely of power consumption. Thus, the modem can perform media encoding/decoding, drive the audio interface, and drive the video interface.

Some additional example flow descriptions are as follows:

Establishing Wi-Fi Connection

1. The device is in range of a known Wi-Fi network.
2. Since the Wi-Fi receiver is always on, it detects the network based on the received beacon or probe response as part if its periodic scan.
3. In a next step the Wi-Fi subsystem informs the modem that it found a new Wi-Fi network which compares the signature with one of the cached profiles.
4. Upon match the modem instructs the Wi-Fi subsystem to connect to the network.
5. In case of no match, it will forward the request to the Application processor which will take action such as indicating the newly found network to the user.

Note: the profile cache can be also part of the Wi-Fi subsystem itself. In this case the Wi-Fi subsystem will automatically connect without involving the modem.

Establishing a Connection Between Modem Application and IMS Endpoint

1. Once the low level connection has been established, the modem application is informed of the new bearer. It will try to establish an IP connection to the known endpoint based on the FQDN that was previously provisioned to the modem application.
2. The modem application therefore needs the IP address of the endpoint. If it does not have already the IP address, it will trigger a DNS lookup using the provisioned DNS server address.
3. The filter engine memorizes the destination IP address as well source port number of the request.
4. The DNS lookup will result in a response from the DNS server containing the IP address of the IMS end point. The filter engine matches the source address and destination port and forwards it accordingly to the modem TCP/IP stack which subsequently passes it to the modem application.
5. The modem application will now try to establish a connection via Wi-Fi with the IMS endpoint.
6. Again the destination address of the IMS endpoint and source port of the request are memorized by the filter engine so that any responses from the corresponding source address and destination port are directed to the modem application. Note: All other packets are routed to the OS.
7. During the subsequent message exchange the modem application gets authenticated and authorized.

Note: during the exchange the IMS endpoint may inform the modem application of additional addresses and connection parameters. The modem application may therefore configure the filter engine to direct other source addresses to the modem.

Establishing a Voice Call Via Wi-Fi and IMS from the Phone

1. The user enters the number and presses call (not shown).
2. The dialer application informs the modem application responsible for calling of the call and passes on the called number.
3. The modem application uses the established connection to signal a call via specific messages defined in the SIP protocol for example.
4. The call signaling is passed to the receiver who may be on a PSTN network.
5. Once the receiver has picked up the phone, the call acceptance is indicated back to the caller and a call bearer is established between respective modem application and the PSTN subscriber on the other end. Gateways in between may translate the call from and to IP packet switched to circuit switched protocols.
6. As both caller and called subscriber engage in the conversation the application processor on the phone can go off as all the processing is handled by the modem and Wi-Fi subsystem. (Note: dialing and user interaction uses the application processor).

Establishing a Voice Call Via Wi-FI and IMS from the Phone where the IMS Application Itself Resides on the Phone and the Modem Establishes Media Streams Through Wi-Fi 1. The user enters the number and presses call.
2. The dialer application informs the IMS application on the phone responsible for the call and passes on the called number.
3. The IMS application on the phone uses its own TCP/IP connection to signal a call via specific messages defined in the SIP protocol, for example. The call signaling is passed to the receiver who may be on a PSTN network.
4. Once the receiver has picked up the phone, the call acceptance is indicated back to the caller. The IMS application on the phone directs the modem to establish a call bearer to the PSTN subscriber on the other end. This bearer uses the established TCP/IP network connection in the modem.

5. As both caller and called subscriber engage in the conversation the application processor on the phone can go off as all the audio processing and communication is handled by the modem and Wi-Fi subsystem. Changes in the call state can be handled by the application processor.

Figure 6:
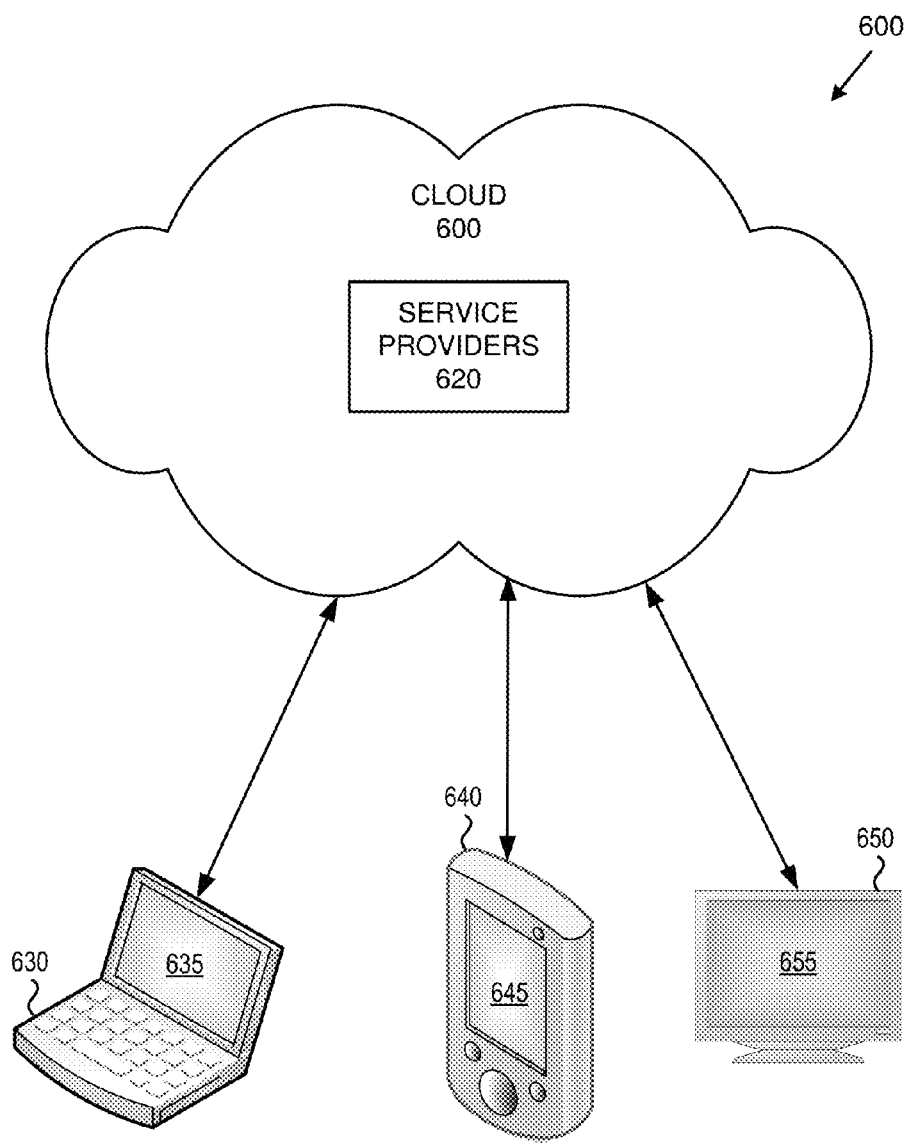
FIG. 6 illustrates that there are a wide variety of devices that can be used in accordance with the embodiments described herein.

FIG. 06 illustrates a generalized example of a suitable implementation environment 600 in which described embodiments, techniques, and technologies may be implemented.

In example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, personal digital assistant, tablet computer, or the like. Connected device 650 represents a device with a large screen 655. For example, connected device 650 could be a television screen (e.g., a smart television) or another device connected to a television (e.g., a set-top box or gaming console) or the like. One or more of the connected devices 630, 640, 650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays. Any of the devices 630, 640, 650 can use the filter engine for switching between cellular and non-cellular networks.

Services can be provided by the cloud 610 through service providers 620, or through other providers of online services (not depicted). For example, cloud services can be customized to the screen size, display capability, and/or touchscreen capability of a particular connected device (e.g., connected devices 630, 640, 650).

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure. Furthermore, telephone calls may include audio, video, and other media and may be accomplished using a variety of protocols including wireline and wireless signaling, SIP-based telephony systems including, but not limited to IMS, and other client-to-network and peer-to-peer protocols (e.g., Skype).

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-readable device having stored thereon computer-executable instructions for causing a plurality of processors to perform a method for communicating over a wireless network, the method comprising:
    initiating a phone call using an application processor; and
    offloading processing of the phone call from an application executing on the application processor to an application executing on a modem processor; and
    initiating a low-power mode for the application processor in response to offloading the processing of the phone call to the modem processor.

2. The computer-readable device of claim 1, wherein the wireless network is a Wi-Fi network.

3. The computer-readable device of claim 1, further including establishing a connection with the wireless network by receiving a network identifier from a wireless beacon, comparing the network identifier with a plurality of cached network identifiers, and if there is a match between the network identifier and one of the cached network identifiers, connecting to the wireless network using the modem processor.

4. The computer-readable device of claim 3, further including when there is not a match, forwarding a request to connect to the network to an application processor.

5. The computer-readable device of claim 1, further including using a profile cache that includes a list of wireless networks to which connection is approved.

6. The computer-readable device of claim 5, wherein the profile cache is located in a modem associated with the modem processor or in a Wi-Fi subsystem connected to the modem.

7. The computer-readable device of claim 1, wherein initiating the phone call using the application processor comprises connecting to an Internet Protocol Multimedia Subsystem (IMS) endpoint.

8. The computer-readable device of claim 1, wherein initiating the phone call using the application processor comprises initiating audio streaming using the application processor and switching to the modem processor to handle media exchange.

9. The computer-readable device of claim 1, wherein offloading processing of the phone call from the application executing on the application processor to the application executing on the modem processor comprises performing media exchange on the modem processor.

10. The computer-readable device of claim 1, wherein offloading processing of the phone call from the application executing on the application processor to the application executing on the modem processor comprises performing audio processing on the modem processor.

11. An apparatus, comprising:
    a first processor for executing a dialer application for initiating a phone call;
    a second processor for executing a modem application, the second processor coupled to the first processor, the second processor to take over control of the phone call initiated by the first processor, and the first processor for entering a low-power mode in response to the second processor taking over control of the phone call; and
    a switching engine coupled to the first processor and the second processor for routing packets of the phone call to be processed by the first processor or the second processor.

12. The apparatus of claim 11, further including a first Internet protocol stack associated with the first processor and a second Internet protocol stack associated with the second processor, and wherein the switching engine is coupled to the first and second Internet protocol stacks and stores the packets in the first and second Internet protocol stacks for processing by the first and second processor.

13. The apparatus of claim 11, wherein the switching engine stores network addresses and switches between sending the packets for processing by the first or second processor based on whether a network address associated with a respective packet of the phone call matches one of the stored network addresses.

14. The apparatus of claim 11, further including a profile cache that includes a list of wireless networks to which connection is approved.

15. The apparatus of claim 11, further comprising an audio pipeline coupled to the second processor, the audio pipeline configured to process the packets of the phone call.

16. An apparatus, comprising:
    an application processor configured to establish a voice call; and
    a modem processor in communication with the application processor, the modem processor configured to take over processing of the voice call established by the application processor, and the application processor configured to enter a low-power mode in response to the modem processor taking over processing of the voice call.

17. The apparatus of claim 16, further comprising a switching engine configured to route voice data packets of the voice call to the modem processor when the modem processor takes over processing of the voice call.

18. The apparatus of claim 16, further comprising:
    a first Internet Protocol stack associated with the application processor;
    a second Internet Protocol stack associated with the modem processor; and
    a switching engine coupled to the first and second Internet Protocol stacks, the switching engine configured to route packets of the voice call to the first Internet Protocol stack for processing by the application processor, and to route packets of the voice call to the second Internet Protocol stack for processing by the modem processor.

19. The apparatus of claim 16, further comprising an audio pipeline in communication with the modem processor, the audio pipeline configured to process voice data.

\* \* \* \* \*